Dec. 9, 1941.　　　C. S. JOHNSON　　　2,265,287
WELDING AND CUTTING APPARATUS
Filed Jan. 25, 1940　　　2 Sheets-Sheet 1
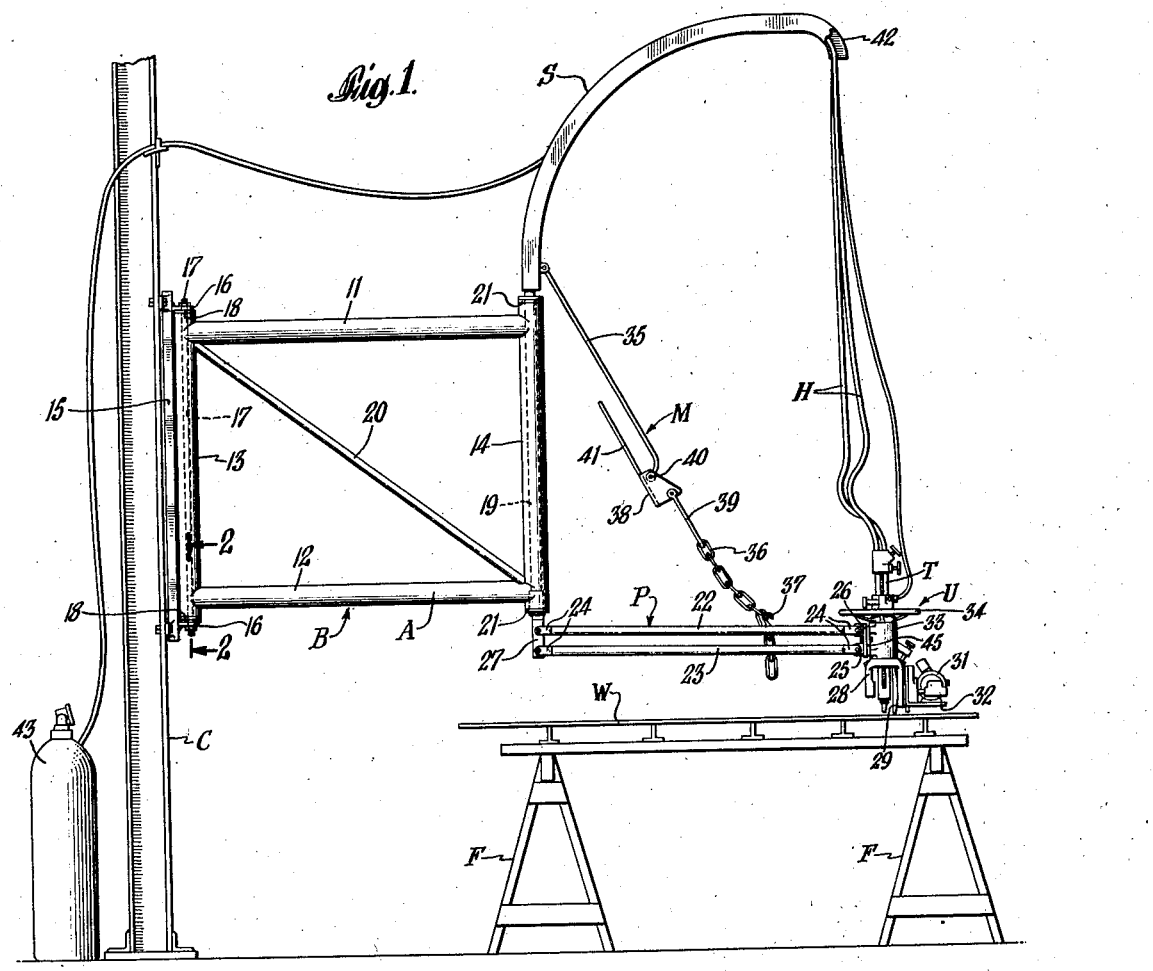
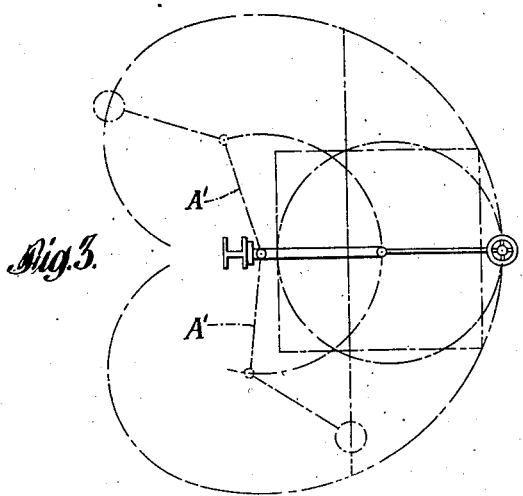
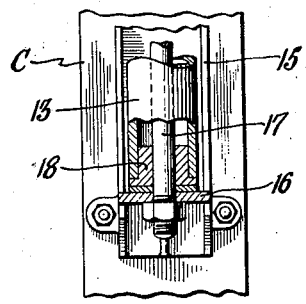
INVENTOR
CHARLES S. JOHNSON
BY
ATTORNEY

INVENTOR
CHARLES S. JOHNSON
BY
ATTORNEY

Patented Dec. 9, 1941

2,265,287

UNITED STATES PATENT OFFICE 2,265,287

WELDING AND CUTTING APPARATUS

Charles S. Johnson, Champaign, Ill., assignor to Oxweld Acetylene Company, a corporation of West Virginia Application January 25, 1940, Serial No. 315,491

13 Claims. (Cl. 266—23)

This invention relates to welding and cutting apparatus and more particularly to a machine adapted to support and propel a blowpipe universally in substantially horizontal planes.

The principal objects of the present invention are to provide an improved type of support adapted to sustain a blowpipe in predetermined position as the blowpipe moves universally in a plane over a work surface; to provide an improved blowpipe support which pivots in a vertical plane while maintaining the blowpipe at a predetermined angle with respect to the work surface; to provide means for supporting the blowpipe and the blowpipe support at one or more predetermined positions in the vertical plane; to provide conveniently operable means for raising and lowering the blowpipe and its support; to provide means for supporting the blowpipe hoses substantially directly above the blowpipe; and to provide a cantilever beam and a wheeled carriage for interchangeable connection with a blowpipe-supporting-and-driving unit. These and other objects will become more readily apparent from the following description and the accompanying drawings wherein:

Fig. 1 is a side elevational view of one form of the apparatus shown pivotally secured to a fixed column;

Fig. 2 is an enlarged sectional view of a portion of the cantilever beam taken on the line 2—2 of Fig. 1;

Fig. 3 is a diagrammatic plan view of the apparatus shown in Fig. 1, the work area which may be encompassed by the machine being shown in broken lines;

Figure 4:
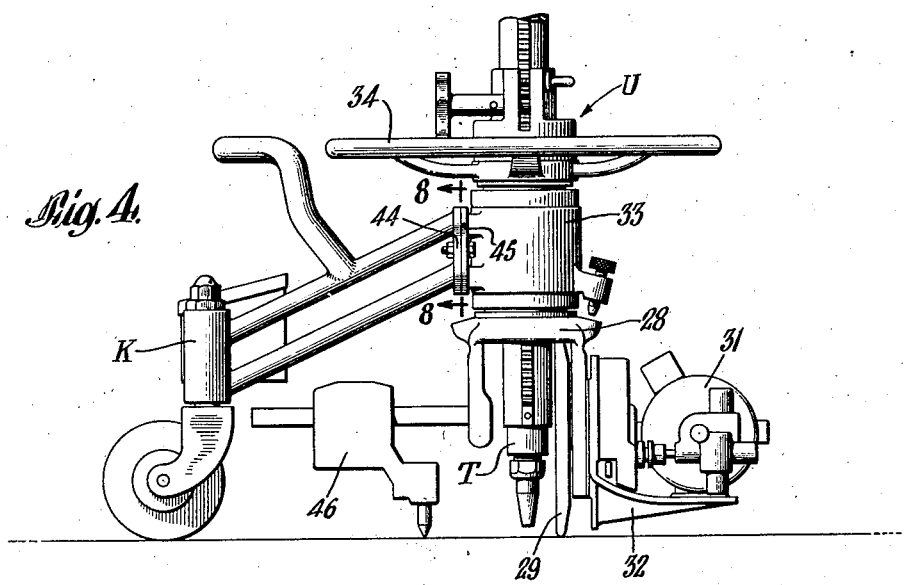
Fig. 4 is a side elevational view of the blowpipe-supporting-and-driving unit with a wheeled carriage interchangeably mounted on the unit.
Figures 5, 6:
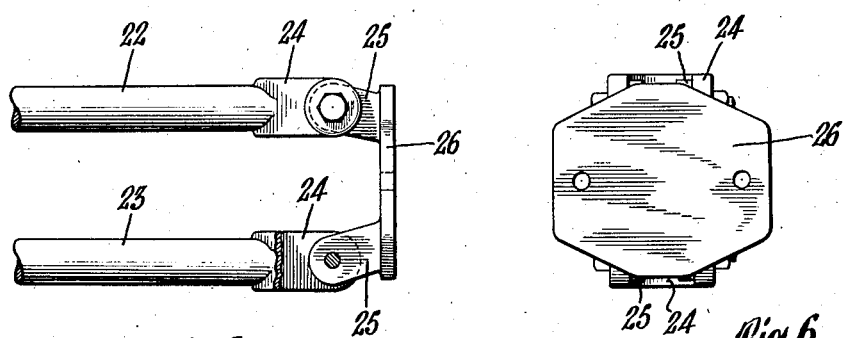
Figure 7:
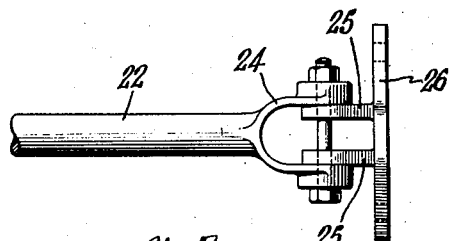
Figure 8:
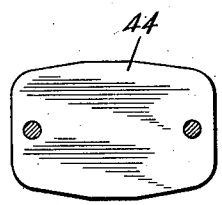

Figs. 5, 6, and 7, are side elevational, end, and top plan views of the free end of the parallel linkage forming part of the beam disclosed in Fig. 1; and Fig. 8 is a sectional view of the mounting plate taken on the line 8—8 of Fig. 4, by means of which a wheeled carriage is secured to the blowpipe-supporting-and-driving unit.

Generally speaking the invention comprises a jointed cantilever beam B having a frame or arm A pivotally mounted at one end to a supporting column C so as to be free to swing about a vertical axis. A bar or extension P extends from the free end of the arm A and preferably is pivotally mounted with respect thereto so as to turn or swing in a horizontal plane about a vertical axis. A blowpipe-supporting-and-driving unit U is secured in operating position to the free end of the bar P. An auxiliary supporting member M assists in maintaining the bar P in a predetermined position, and a hose support S holds the gas-supply and electrical conduits at all times substantially directly above the blowpipe. A base F serves as a support for a substantially horizontal workpiece W. Provision is made whereby a wheeled carriage K and the cantilever beam B may be interchangeably secured to the blowpipe unit U.

As shown in Figs. 1, 2, and 3, the jointed cantilever beam B comprises a substantially rigid frame or arm A preferably formed of tubular or similar members 11, 12, 13, and 14, welded or otherwise secured together so as to form a built-up beam preferably of rectangular shape. The frame may be reinforced by a diagonal brace 20. The frame A is pivotally connected to the column C, as by means of a bracket 15 which may be clamped, bolted, or otherwise secured to the column C, such bracket having lugs 16 projecting therefrom to receive a pivot pin 17 extending vertically through the beam member 13. Preferably the bracket 15 is adjustable vertically on the column C. Suitable thrust bearings 18 are provided at the top and bottom of the member 13 adjacent to the lug 16 to minimize friction and lost motion. By means of the supporting structure disclosed, the arm A may swing about a vertical axis through an arc exceeding 180°, the extreme positions being indicated by the broken lines A' in Fig. 3.

The bar P in turn is pivoted or swiveled at one end to the free end of the arm A by means of a post or shaft 19 extending through the member 14 parallel to the pin 17. Suitable bearings 21 may be provided at the top and bottom extremities of the member 14 to take up vertical thrust and to reduce friction. The post 19 preferably extends below the level of the member 12 forming a portion 27 to which the bar P connects for projection in a substantially horizontal direction. The right-hand or free end of the bar P is adapted to be connected to a suitable blowpipe-supporting-and-driving unit U in a manner to be more fully described. Although the bar P may comprise a single or double link rigidly secured to the portion 27, reinforced or braced as by means of the member M, it preferably comprises a parallel linkage which includes generally horizontal pivoted links 22 and 23 as shown in Figs. 1 and 5. Both ends of the links 22 and 23 are provided with clevises 24 for pivotal connection at one end with lugs 25 extending from a connecting plate 26, and for connection at the opposite end with the portion 27 that forms an extension of the post 19. The parts 22, 23, 26, and 27 comprise the links of a parallel bar linkage which allows the bar P to rise and fall in a vertical plane while maintaining the plate 26 parallel to the portion 27.

The blowpipe-supporting-and-driving unit U may be of any conventional design, such that it may swivel about a vertical axis with respect to the supporting structure. A preferred form of blowpipe unit of the type shown in Fig. 4 is more fully disclosed in Patent No. 2,148,666, dated February 28, 1939. Essentially, the unit U comprises a generally tubular blowpipe mount 28 adapted to receive a cutting-blowpipe or similar thermal tool T. The unit is propelled by a traction wheel 29 journaled within a fork at the lower end of the mount adjacent to the blowpipe T. The wheel is driven through suitable speed-reduction gearing by a motor 31 mounted on a bracket 32. The unit U is swivelly supported within a mounting collar 33, and may be steered by means of a handwheel 34 secured to the blowpipe mount 28. The plate 26 is constructed to be connected to a mounting flange 45 on the collar 33 to join the unit with the beam B. By means of the pivoted parallelogram linkage forming the bar P, the unit U may rise and fall in accordance with undulations in the surface of the workpiece W, the unit being held against the top of the work by its own weight. However, the angular position of the unit U and the blowpipe T with respect to the work surface is maintained constant at all times. For example, with the arrangement shown in Fig. 1 the members 26 and 27 are vertical and are arranged to maintain the blowpipe T in a vertical position as the links 22 and 23 pivot in a vertical plane about their respective axes.

Ordinarily the links 22 and 23 are substantially horizontal, and the unit U, while in operation, rests upon the workpiece W with the wheel 29 tractionally engaging the work surface under the influence of the weight of the unit U and its associated parts. Whenever the unit is being manipulated into operating position or when the machine is not in use, it is desirable that the traction wheel be held above its surface-engaging position. To suspend the unit U above or away from the surface of the work, an adjustable supporting member M is provided which extends from a point adjacent to the top of the post 19 at the free end of the arm A to the bar P, thereby sustaining the latter in the desired position. Preferably the member M comprises an inelastic tension member composed of two or more elements which extend from a point adjacent to the top and end of the arm A diagonally downwardly and outwardly for connection with the bar P. The member M may comprise one or more rods 35, a chain 36, or a combination of the two, as shown in Fig. 1. A hook 37 projects from the bar P for engagement with the respective elements of the chain 36 for selectively supporting the unit U at one of several predetermined elevations. The member M normally is slack when the apparatus is operating but becomes taut whenever the member M supports the unit U, as when the unit U rides over the edge of the workpiece W.

When the apparatus is not in use, or when the unit U is being located on the workpiece W, it is desirable to support the unit a slight distance from the work surface thereby allowing the suspended unit to be moved manually and freely in any direction in a horizontal plane. The unit U may be raised by a lifting device preferably incorporated in and forming a part of the member M. As shown in Fig. 1, the lifting device comprises a lever mechanism 38 connecting with the rod 35 and with a yoke 39 extending from the upper end of the chain 36. The lever mechanism 38 operates in the manner of a toggle lever, and is provided with a handle 41 which may be pivoted downwardly about the fulcrum 40 at the end of the rod 35 causing the yoke 39 to be pivoted upwardly until it passes the dead-center position. The operation shortens the member M, thereby lifting the bar P and raising the unit U slightly from the work surface.

The hose support S preferably comprises a gooseneck of tubular or channel cross section secured at the lower end to the post 19 and extending upwardly and outwardly therefrom. The support S preferably terminates in a downwardly curved portion 42 which is located substantially directly above the blowpipe T. The bar P and the support S preferably are located in the same vertical plane and swivel together with the post 19, so that the supply conduits, such as the flexible gas hoses H, extending from a suitable source of gas supply 43 always will depend substantially vertically downwardly from the support S to the unit U. With such an arrangement the unit U may be moved to any position on or over the workpiece W with the hoses H held out of the way of the operator at all times.

Referring to Fig. 4, the unit U is shown in connection with a carriage K, preferably having two swiveled wheel supports, to which it is attached by means of a mounting plate 44, best seen in Fig. 8, and substantially identical with the connecting plate 26. Plates 44 and 26 are interchangeably connectable to a mounting device such as a flange 45 on the unit U as by bolts or other similar means. Accordingly, it is possible with the present arrangement to disconnect the unit U from a cantilever beam B of the type shown in Fig. 1 and connect it to a carriage K of the type shown in Fig. 4, thereby converting the apparatus to a fully portable unit. The complete apparatus disclosed in Fig. 4 is self-supporting and self-propelling, and may be guided at will over a work surface, or may be employed in connection with a radius-rod attachment 46 for circle cutting. The unit U is free to swivel within the collar 33 irrespective of whether it is connected to the beam B or to the carriage K. The cutting range of the beam-supported apparatus is indicated in Fig. 3 wherein the maximum circle size, the maximum square size, and the longest straight line which may be formed with the apparatus are diagrammatically illustrated in broken lines. The frame A can be adjusted to approximate positions up and down along the column C to set the apparatus so it will operate on workpieces at various heights; and the extension P takes care of minor differences in height of the work surface operated upon.

The apparatus herein disclosed is susceptible to modification without departing from the principles of the invention or sacrificing its advantages.

I claim:

1. In cutting or welding apparatus, a blowpipe holder; and a jointed beam for supporting said blowpipe holder for movement in any direction in horizontal planes and for maintaining said holder in predetermined angular relation to said planes, said jointed beam comprising an arm turnable at one end about a vertical axis, a pair of parallel links extending from the free end of said arm to said blowpipe holder, the ends of said parallel links being pivoted about parallel horizontal axes to said arm and to said blowpipe holder, respectively, said links thereby being free to shift about said axes in a vertical plane, and an inelastic diagonal tension member extending between said arm and said parallel links to limit the downward shifting motion of said links, said tension member including a manually operable lifting device adapted during a single movement to shorten the effective length of said tension member by a fixed amount, thereby to pivot said links about their respective axes through a predetermined arc upwardly in a vertical plane.

2. In cutting or welding apparatus, a blowpipe holder adapted to receive a blowpipe; a jointed cantilever beam for supporting said blowpipe holder for movement in any direction in a horizontal plane, comprising an arm pivoted at one end about a vertical axis with respect to a fixed column, and a bar extending from the free end of said arm to said blowpipe holder, said bar being swiveled about a vertical axis to the free end of said arm; and a blowpipe-hose support extending over said bar from one end to the other and adapted to sustain gas hose extending from an elevated position of said column to said blowpipe, said support being secured to said bar and being free to swivel therewith.

3. Apparatus as claimed in claim 2 wherein the swiveled connection between said arm and said bar comprises a vertical post connected to and extending upwardly from said bar, in swiveled relation to said arm, and wherein said blowpipe-hose support connects with said post.

4. In a cutting or welding machine, a blowpipe holder adapted to receive a blowpipe, said holder including wheel means for supporting said blowpipe in operative relation to a horizontal work surface; a jointed cantilever beam for supporting said blowpipe holder for movement in any direction in a horizontal plane, comprising an arm pivoted at one end about a vertical axis with respect to a fixed support, and a bar extending from the free end of said arm to said blowpipe holder, said bar being connected at one end to the free end of said arm for swiveling movement about a vertical axis and for pivotal movement in a vertical plane; and an inelastic member extending diagonally downward from the end of said arm to said bar, said member being slightly slack whenever said wheel means engages said work surface, said member becoming taut for sustaining said bar at a predetermined position in said vertical plane whenever said wheel means no longer engages said work surface.

5. Combination as claimed in claim 4 including means operative to vary by definite predetermined increments the effective length of said member, to thereby adjust the position at which said bar is sustained.

6. In a cutting or welding machine, a blowpipe holder adapted to receive a blowpipe; a jointed cantilever beam for supporting said blowpipe holder for movement in any direction in a horizontal plane, comprising an arm pivoted at one end about a vertical axis with respect to a fixed support, a vertical post swivelly depending from the free end of said arm, and a pair of parallel bars pivotally extending from the lower end of said post to said blowpipe holder for swiveling movement with said post about a vertical axis and for pivotal movement relative to said post in a vertical plane; and a tension member including a chain having links extending from the upper end of said post diagonally downward and outward to said bars, said links being selectively engageable with said bars for supporting said bars in one of several predetermined elevations in said vertical plane.

7. Blowpipe apparatus comprising a blowpipe-supporting-and-driving unit adapted to receive a blowpipe and having a traction wheel for propelling said unit over a work surface; and means for sustaining said unit with said blowpipe disposed in operative relation to said work surface and with said wheel in rolling engagement with said work surface comprising a jointed cantilever beam, said beam comprising a rigid rectangular frame having a vertical pivot pin extending vertically along one end thereof and pivoting said frame to a supporting column, and substantially horizontal parallel links pivotally connecting the free end of said frame and said unit, said links being adapted to rise and fall in a vertical plane while maintaining said unit in the same angular relation to said work surface.

8. Apparatus as claimed in claim 7 including means for lifting said unit from rolling engagement with said work surface, and for supporting said unit in such lifted position.

9. Blowpipe apparatus comprising a blowpipe-supporting-and-driving unit adapted to receive a blowpipe and having a traction wheel for propelling said unit over a work surface; a mounting flange on said unit; and interchangeable means for sustaining said unit with said blowpipe disposed in operative relation to said work surface and with said wheel in rolling engagement with said work surface, comprising an articulated cantilever beam swingable over said work surface, and a two-wheeled carriage, said beam and said carriage each being provided with mounting plates interchangeably mountable on said mounting flange of said blowpipe-supporting-and-driving unit.

10. Cutting and welding apparatus, comprising a cantilever beam pivoted about a vertical axis at one end thereof to a support, said beam being articulated about a vertical axis at a point intermediate the ends thereof; a blowpipe holder secured to said beam at the free end thereof and movable therewith in varying directions in a horizontal plane, said holder being adapted to receive a cutting or welding blowpipe; and a hose support of generally channel cross section secured to and movable with said beam and extending arcuately above said beam from the articulated joint to a terminal portion located substantially directly above said blowpipe holder, whereby gas-supply hoses may rest along said hose support and may extend substantially vertically downward from said terminal portion to said blowpipe.

11. In a cutting or welding machine, a blowpipe holder adapted to receive a blowpipe; a jointed cantilever beam for supporting said blowpipe holder for movement in any direction in a horizontal plane, comprising an arm pivoted at one end about a vertical axis with respect to a fixed support, a vertical post swivelly depending from the free end of said arm, and a pair of parallel bars pivotally extending from the lower end of said post to said blowpipe holder for swiveling movement with said post about a vertical axis and for pivotal movement relative to said post in a vertical plane; and a tension member extending from the upper end of said post diagonally downward and outward to said bars for sustaining said bars in at least one predetermined position in said vertical plane, said tension member including a manually operable lever mechanism adapted when in one position to allow said member to sustain said bars substantially horizontally, and adapted when moved to a second position to shorten the effective length of said member to raise said bars slightly.

12. Blowpipe apparatus comprising a blowpipe-supporting-and-driving unit; a mounting device on said unit; and interchangeable supporting means for supporting said unit in operative relation to a work surface, comprising a cantilever beam swingable in varying directions over said surface, and a wheeled carriage, said beam and said carriage being provided with mounting means interchangeably mountable on said mounting device of said blowpipe-supporting-and-driving unit.

13. Blowpipe apparatus comprising a blowpipe-supporting-and-driving unit adapted to receive a blowpipe, and having a traction wheel for propelling said unit over a work surface; and means for supporting said unit for movement in varying directions over said work surface comprising a mounting collar about said unit, a swinging cantilever beam pivotally supported adjacent to one of its ends for swinging movement in a substantially horizontal plane over said work surface, and a wheeled carriage, said carriage and the free end of said beam each being provided with similar mounting means interchangeably mountable on said mounting collar of said blowpipe-supporting-and-driving unit, said unit being swively mounted about a vertical axis with respect to said collar and supporting means.

CHARLES S. JOHNSON.